July 29, 1941.　　J. W. FITZ GERALD ET AL　　2,250,795
COOLING SYSTEM FOR AUTOMOTIVE VEHICLE ENGINES
Filed Dec. 11, 1939　　2 Sheets-Sheet 1

Inventors
John W. FitzGerald
Austin Gudmundsen

July 29, 1941.    J. W. FITZ GERALD ET AL    2,250,795
COOLING SYSTEM FOR AUTOMOTIVE VEHICLE ENGINES
Filed Dec. 11, 1939    2 Sheets-Sheet 2

Inventors
John W. FitzGerald
Austin Gudmundsen
By
Attorney

Patented July 29, 1941

2,250,795

UNITED STATES PATENT OFFICE 2,250,795

COOLING SYSTEM FOR AUTOMOTIVE VEHICLE ENGINES

John W. Fitz Gerald and Austin Gudmundsen, Milwaukee, Wis.; said Gudmundsen assignor to Gudmundsen-Stratton Laboratories, Inc., Milwaukee, Wis., a corporation of Wisconsin Application December 11, 1939, Serial No. 308,670

9 Claims. (Cl. 180—68)

This invention relates to automotive vehicles and refers particularly to automobiles and trucks equipped with water cooled internal combustion engines.

The use of radiators consisting of a core having a multiplicity of small passages has come to be regarded as an indispensable part of the cooling systems of automotive vehicles. These radiators constitute quite an item of expense in the total production cost of an automobile; and inasmuch as modern trends in design are making it more and more difficult to mount the radiators in positions where they have the required degree of effectiveness, a cooling system which would function satisfactorily without a conventional radiator would have much to recommend it.

It is, therefore, one of the objects of this invention to provide a new manner of dissipating the heat from the cooling liquid by which conventional radiators are entirely obviated.

The engines in all vehicles are mounted in compartments enclosed by suitable walls, at least parts which are exposed to the external atmosphere or to air currents which obtain during the operation of the vehicle. These walls have substantial area and can be used to effectively transfer heat.

It is, therefore, a further object of this invention to provide a cooling system for automobiles and the like wherein radiator-like passages or chambers are formed on the external walls of the engine compartment through which the cooling liquid is circulated to carry off the heat of the engine.

Another object of this invention is to utilize the top wall of the conventional engine compartment as a radiator for dissipating the heat carried off from the engine by the cooling liquid.

Another object of this invention is to so connect passages formed in the top wall of the compartment with the engine cooling system that the top wall may be swung on its hinged mounting to and from closed position.

A further object of this invention resides in the provision of an engine compartment having a plurality of walls, each of which is provided with a passage for cooling liquid so connected that the cooling liquid flows successively through the various passages.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate two complete examples of the physical embodiment of the invention constructed in accordance with the best modes so far devised for the practical application of the principles thereof, and in which.

Figure 1:
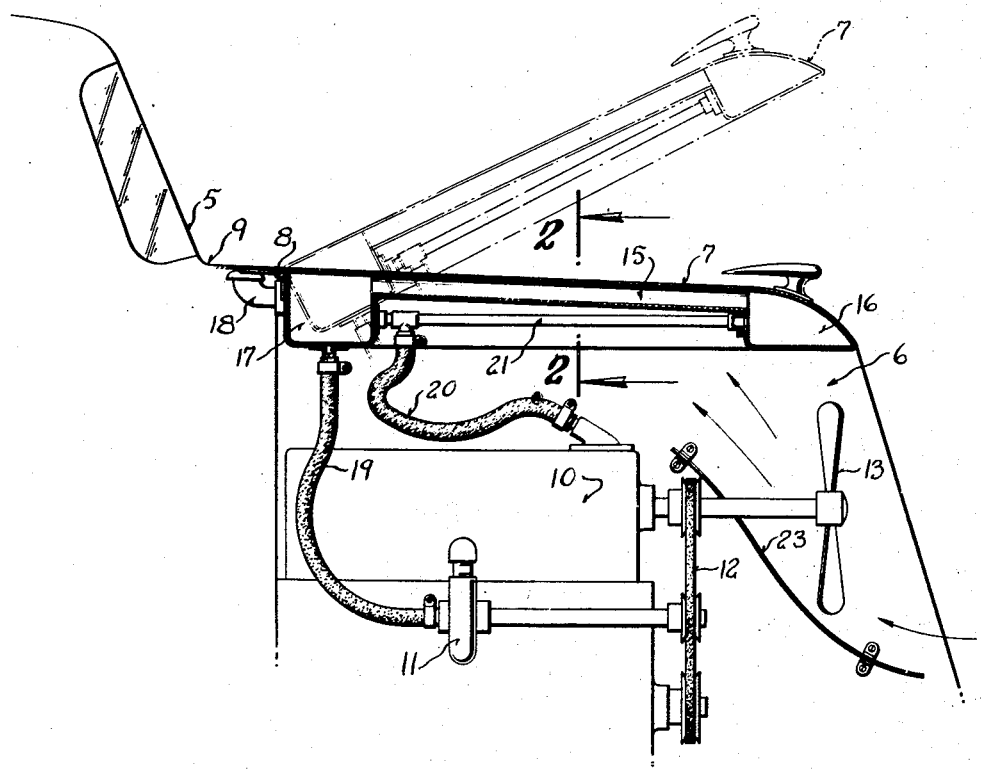
Figure 1 is a longitudinal sectional view through the engine compartment of a conventional automobile illustrating the application of this invention thereto.
Figure 2:
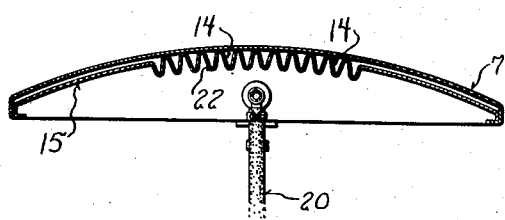
Figure 2 is a cross sectional view taken through Figure 1 on the plane of the line 2—2.
Figure 3:
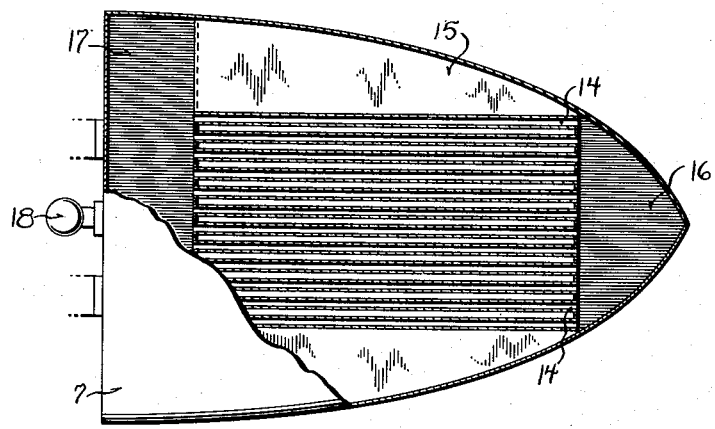
Figure 3 is a plan view with parts broken away and in section of the engine compartment cover.

Referring now particularly to the accompanying drawings in which like numerals indicate like parts, the numeral 5 designates an automotive vehicle having an engine compartment, indicated generally by the numeral 6. In the present instance, the front end of the conventional passenger automobile is illustrated, and the engine compartment is in the front or, as it is commonly termed, under the hood of the automobile.

The top of this engine compartment is closed by a cover 7 hinged as at 8 to the cowl 9 of the vehicle body. The cover thus swings upwardly, as indicated in dotted lines, to afford access to the interior of the engine compartment.

The sides of the compartment are closed by walls of any suitable construction, and the front thereof may be closed by a grill, not shown.

Inside of the compartment is the engine 10 which is of the water cooled type having jackets (not shown) for the circulation of cooling liquid around the cylinders and having a water pump 11 to promote the desired circulation of cooling liquid. The pump 11 is driven by a fan belt 12, which also drives a fan 13.

In place of the usual radiator mounted in front of the fan, the cover 7 has an inner wall 15 secured thereto at its side edges in spaced relation to the cover to form a shallow passage for the circulation of cooling liquid therethrough.

The ends of the passage open to front and rear tanks 16 and 17, respectively. These tanks are preferably mounted directly under the outer wall of the cover 7 and if desired, may be so designed that the cover constitutes a wall thereof. The rear tank 17 which is on a higher level than the front tank, has a filling spout 18 connected thereto accessible through the customary cowl vent opening (not shown) to provide for filling the cooling system with water or other cooling liquid.

This rear tank 17 is connected through a hose 19 with the inlet of the pump 11, and the front tank 16 is connected by means of a hose 20 and a pipe 21 with the water jacket of the cylinder block.

Consequently, when the engine is in operation, the cooling liquid circulates through the engine block into the front tank 16, back through the passage 14, to the rear tank 17, and from there back to the water pump.

While the surfaces contacting the air currents incidental to operation of the vehicle are generally of sufficient area for adequate cooling, more rapid heat transfer may be obtained by corrugating a portion of the inner wall 15 as at 22. By so corrugating this wall, the passage is divided into a number of adjacent separate sections, and the area of the inner wall 15 is materially increased.

It is also desirable to direct the air stream induced by the fan 13 upwardly against this corrugated portion of the inner wall by means of a baffle plate 23.

Attention is directed to the fact that the connection from the engine cooling system to both front and rear tanks is effected adjacent to the hinge connection 8 so that the cover may be swung to its raised position without interference from these connections.

Figure 4:
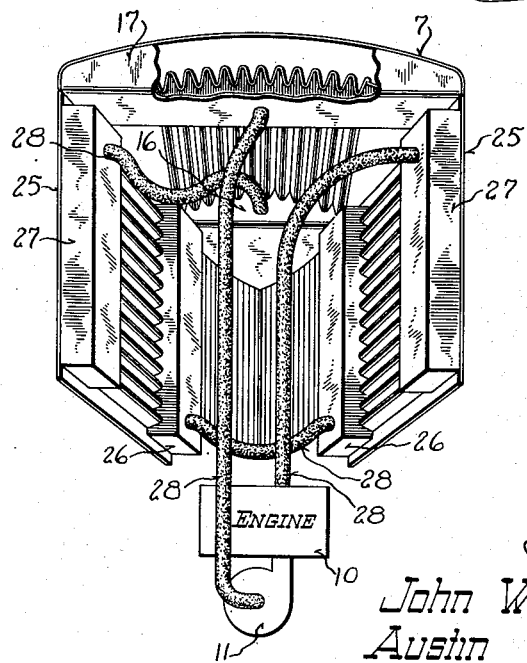
Figure 4 is a view more or less diagrammatically illustrating a modified embodiment of this invention wherein the side walls as well as the top wall of the engine compartment are utilized for cooling passages.

If desired, the invention may be embodied in the modified construction shown in Figure 4. In this instance, the side walls 25, as well as the cover of the engine compartment, are equipped with cooling passages for the circulation of the cooling medium.

Each of these side walls has front and rear tanks 26 and 27, respectively, the same as the cover; and the connections 28 between the various water passages and the engine is such that the cooling liquid flows serially from the engine into the rear tank of one side wall, from the front tank of this side into the front tank of the opposite side wall, from the rear tank of this opposite side wall to the front tank of the cover, and from the rear tank of the cover back to the inlet of the pump.

In other respects the embodiment illustrated in Figure 4 follows the construction shown and described in the preferred embodiment of the invention.

From the foregoing description taken in connection with the accompanying drawings, it will be apparent that this invention provides an improved cooling system for water cooled internal combustion engines of automobiles and that it eliminates the necessity for the conventional radiator.

What we claim as our invention is:

1. In an automobile having an engine compartment: a hinged cover closing the top of the compartment; two spaced tanks carried by the cover; an inner wall underlying the outer wall of the cover and coacting therewith to form a passage joining said tanks; a liquid cooled internal combustion engine in the compartment having a pump and jackets for the circulation of the cooling liquid; and means for connecting the pump and jackets with the tanks on the cover so that the cooling liquid circulates from one tank to the other through said passage to carry off the heat from the engine.

2. In an automotive vehicle having an engine compartment: a movable cover for said compartment having an imperforate external wall shaped to conform to the design of the vehicle; spaced tanks carried by the cover; an inner wall underlying said external wall and coacting therewith to form a liquid passage connected at its ends with said tanks; a liquid cooled internal combustion engine in the engine compartment having passages for the circulation of a cooling liquid; and flexible connections between the tanks and the engine whereby the cooling liquid is circulated from one tank to the other through said passage to carry off the heat of the engine and whereby said cover may be opened without disturbing said connections.

3. In combination: an engine compartment having imperforate side and top walls; tanks at opposite ends of each wall; means overlying said walls to coact therewith in the formation of chambers joining the tanks at opposite ends thereof; an internal combustion engine having passages for the circulation of a cooling liquid and having a pump; and means for serially connecting the pump and the cooling liquid jackets of the engine with the tanks and passages of the respective walls of the compartment so that the cooling liquid is circulated successively through the chambers of the various walls of the engine compartment.

4. In an automobile: an engine compartment open at one end to admit air thereto, and having at least one imperforate wall; a liquid cooled internal combustion engine in said compartment; two spaced tanks carried by said wall inside the engine compartment; means cooperating with said wall to provide a liquid passage joining said tanks and against which cooling air flows from the open end of the compartment during operation of the automobile; and means for connecting the tanks with the cooling system of the engine, whereby the cooling liquid is circulated from one tank to the other.

5. In an automotive vehicle having an engine compartment, at least one wall of which is imperforate, said compartment being open at one end to admit air thereinto during operation of the vehicle: spaced tanks mounted on the inside of said wall; another imperforate inner wall coacting with said imperforate wall to provide a liquid passage connecting said tanks, said inner wall being swept by cooling air admitted into the compartment through the open end thereof during operation of the vehicle; a liquid cooled internal combustion engine in said engine compartment having a pump and a cooling liquid jacket; and means for connecting said tanks with the pump and the cooling liquid jacket, whereby the cooling liquid is circulated from one tank to the other through said passage.

6. In an automobile having an engine compartment open at one end to admit air thereinto during operation of the automobile: a hinged imperforate cover for closing part of the compartment; means carried by the underside of the cover and coacting therewith to form a chamber for engine cooling liquid, said chamber being adapted to be swept by cooling air entering the open end of the compartment and by air at the exterior of the compartment during travel of the automobile; an internal combustion engine of the liquid cooled type in the engine compartment; and means for connecting the cooling system of the engine with said chamber in the cover of the engine compartment so that the cooling liquid is circulated through said chamber.

7. In an automobile having an engine compartment open at one end to admit air thereinto during operation of the automobile: a hinged imperforate cover for closing the top of the compartment; means carried by the cover at its underside and coacting therewith to form a chamber for engine cooling liquid, said chamber being adapted to be swept by coolinug air entering the open end of the compartment and by air at the exterior of the compartment during operation of the automobile; an internal combustion engine of the liquid cooled type in the engine compartment; and means for connecting the cooling system of the engine with said chamber in the cover of the engine compartment so that the cooling liquid is circulated through said chamber, said connection including flexible ducts whereby the cover may be lifted to afford access to the engine compartment without necessitating disconnecting the engine cooling system from said chamber.

8. In an automobile having an engine compartment open at one end to receive air therein: a hinged imperforate cover for the compartment; means on the interior of said cover forming a surface of greater area than that of the exterior of the cover and coacting therewith to form a radiator for the cooling liquid of the engine, said surface being subjected to the effects of air entering the compartment through the open end thereof; a liquid cooled internal combustion engine in said compartment having a pump and jackets for the circulation of a cooling liquid; and means for connecting the pump and the jackets with the radiator on the cover so that the cooling liquid circulates through the radiator on the cover to carry off the heat of the engine.

9. In an automobile having an engine compartment open at one end to admit air thereinto: a hinged imperforate cover for the compartment; means on the interior of said cover subjected to the effects of cooling air entering the compartment through its open end forming a radiator for the cooling liquid of the engine; a liquid cooled internal combustion engine in said compartment having a pump and jackets for the circulation of a cooling liquid; and means for connecting the pump and jackets with the radiator on the cover so that the cooling liquid circulates through the radiator on the cover to carry off the heat of the engine, said connecting means including flexible ducts which enable the hinged cover to be opened without disturbing the connections of its radiator with the engine.

JOHN W. FITZ GERALD.
AUSTIN GUDMUNDSEN.